Figure 1:
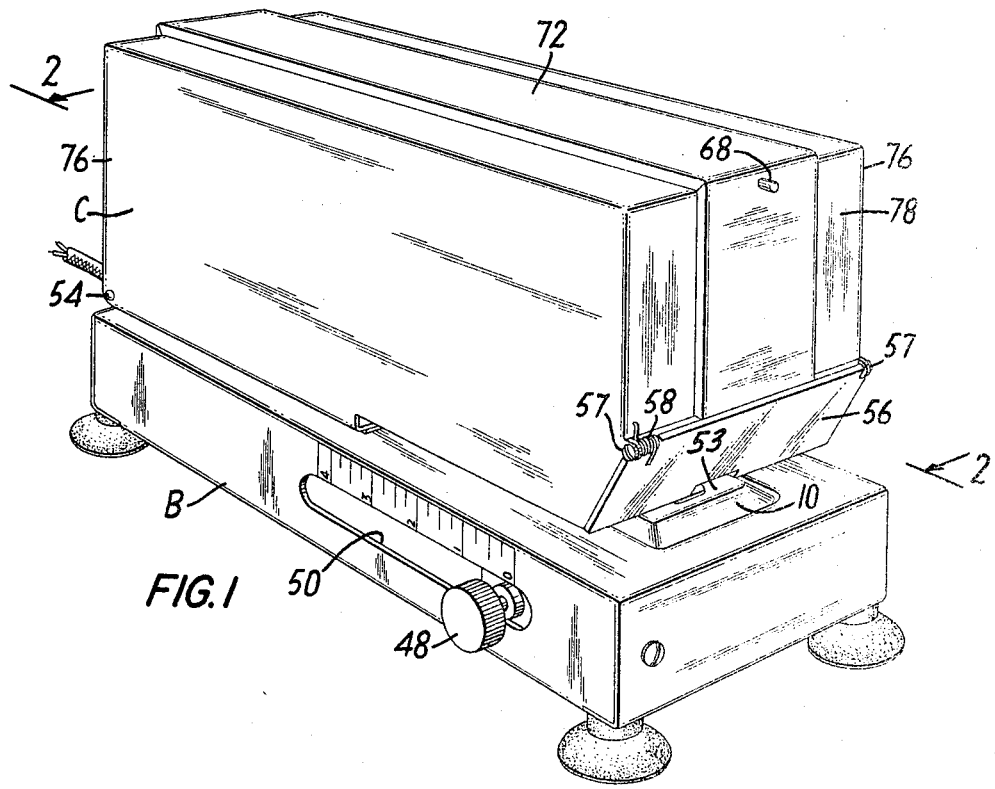

Nov. 1, 1966  E. T. MARCH  3,282,489

PORTABLE SOLENOID DRIVEN STAPLER

Filed Jan. 12, 1965  7 Sheets-Sheet 1

INVENTOR.
EARL T. MARCH

BY Richard S. Shreve
ATTORNEY

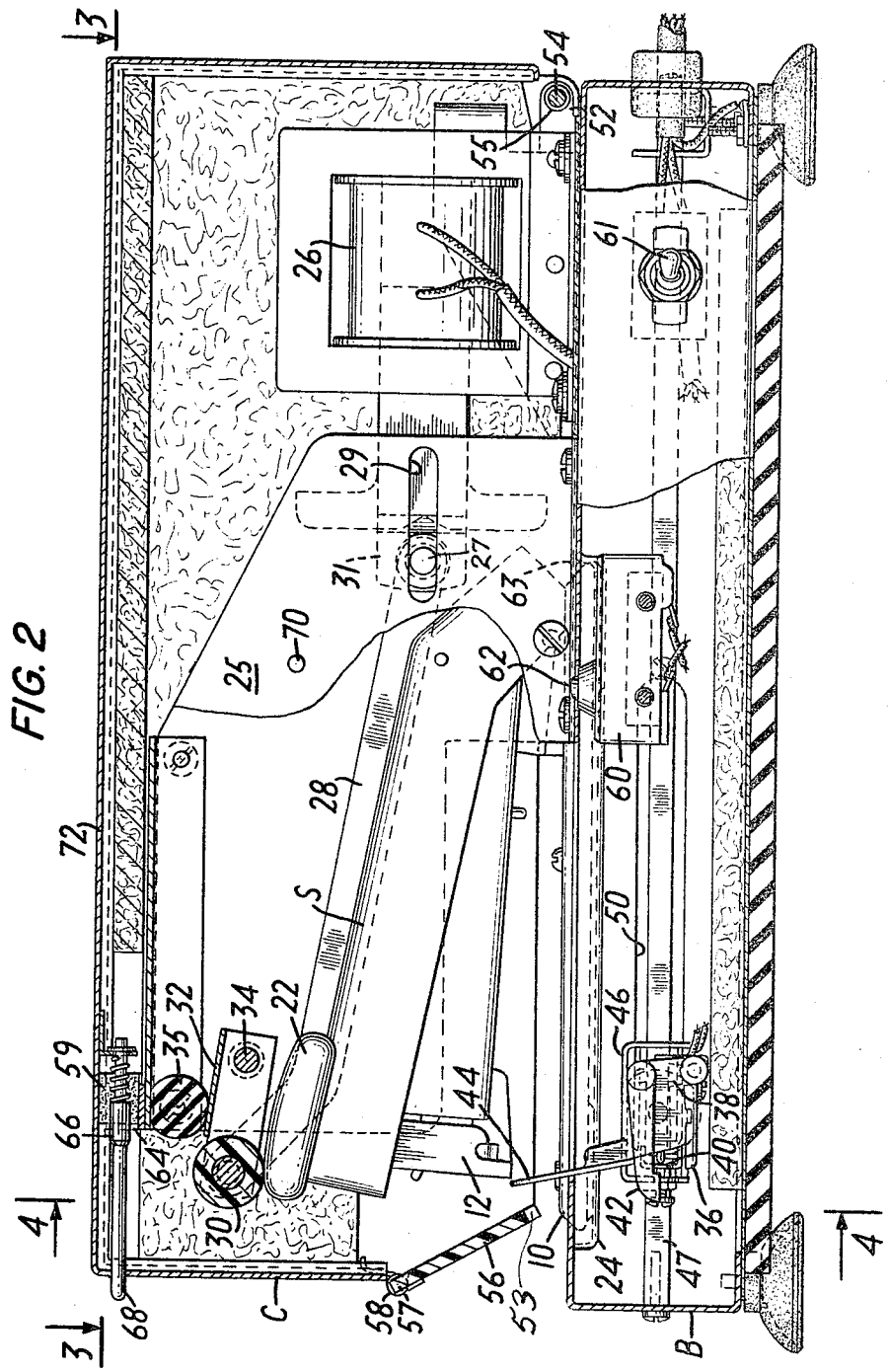

Nov. 1, 1966     E. T. MARCH     3,282,489
PORTABLE SOLENOID DRIVEN STAPLER
Filed Jan. 12, 1965     7 Sheets-Sheet 3
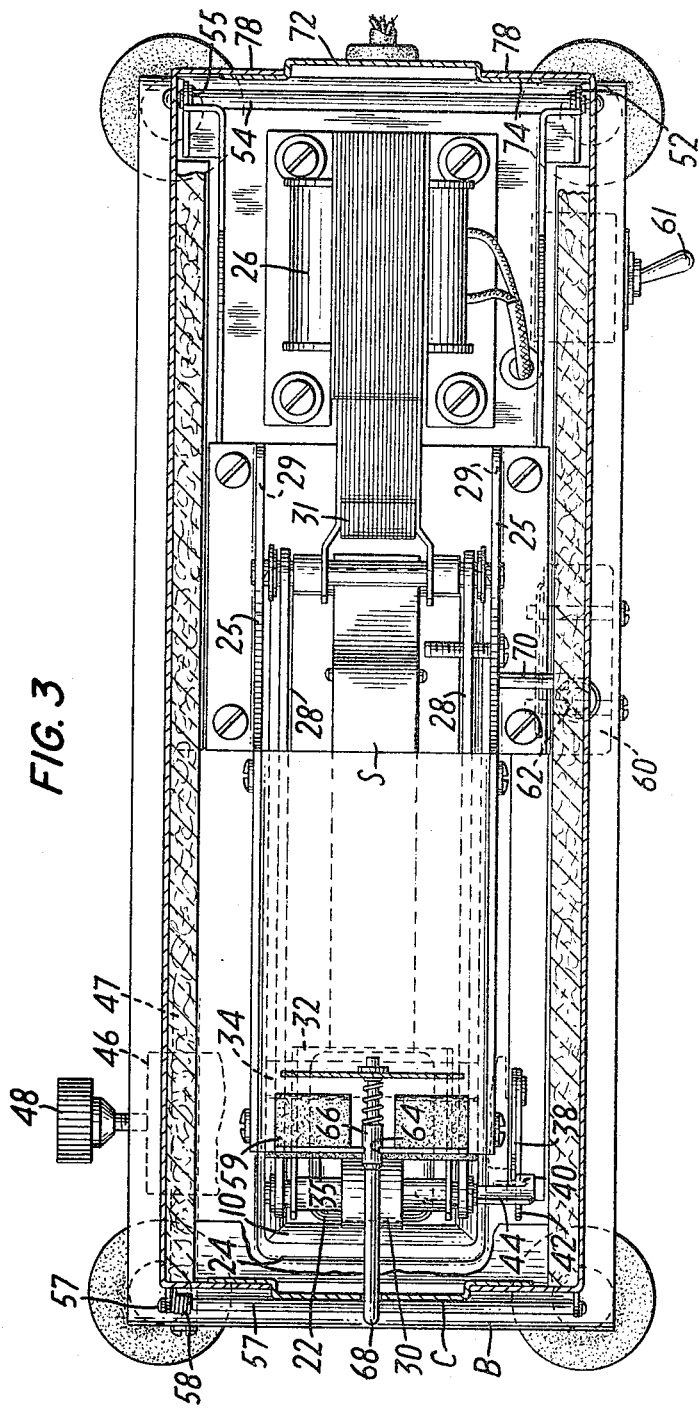
INVENTOR.
EARL T. MARCH
BY *Richard S. Shreve Jr.*
ATTORNEY Nov. 1, 1966         E. T. MARCH         3,282,489
PORTABLE SOLENOID DRIVEN STAPLER
Filed Jan. 12, 1965                    7 Sheets-Sheet 4
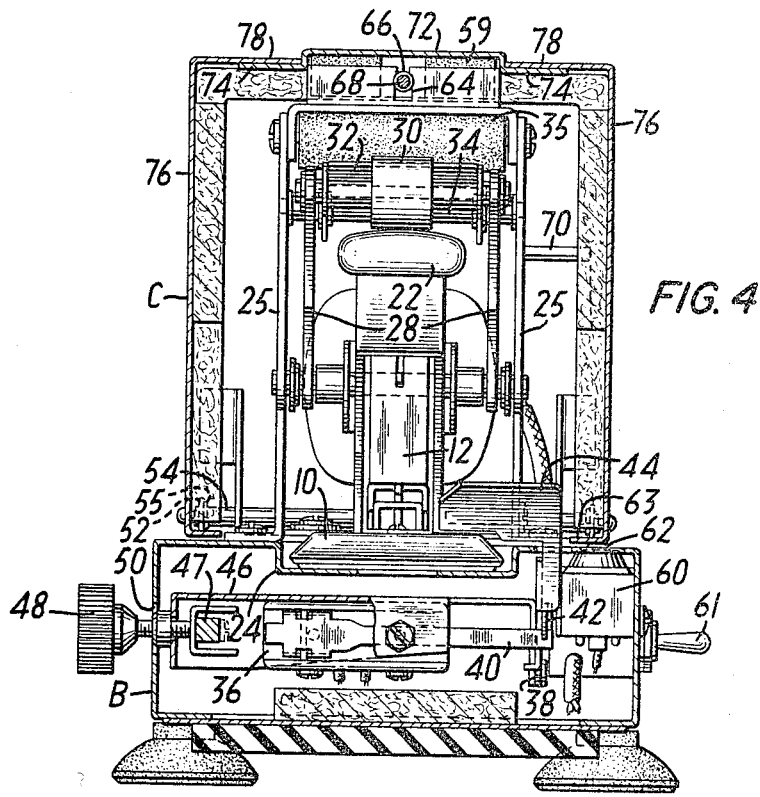
FIG. 4
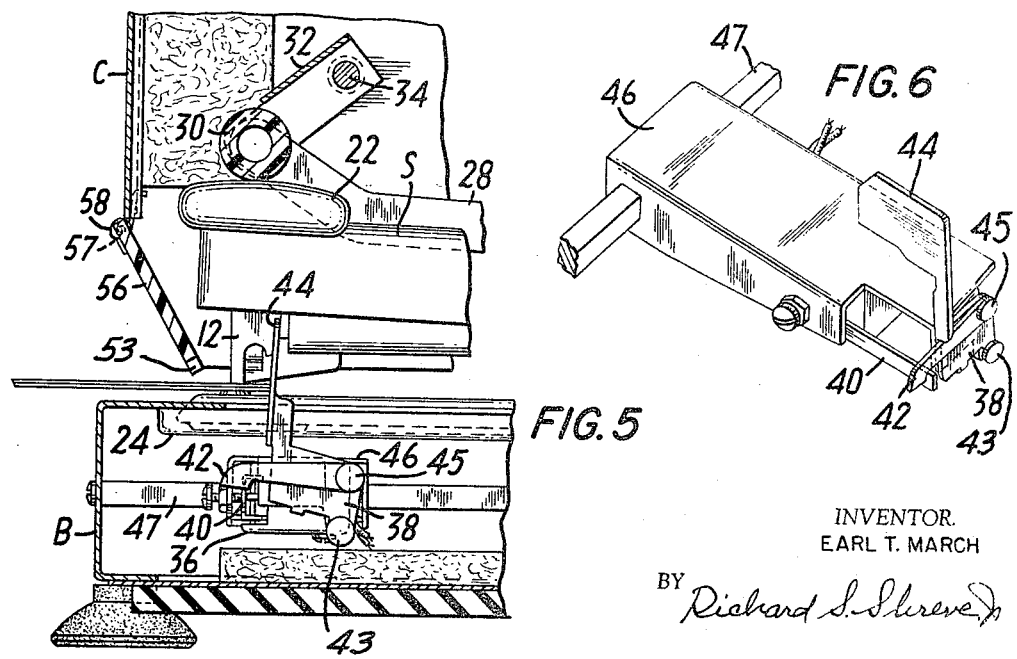
FIG. 5
FIG. 6
INVENTOR.
EARL T. MARCH
BY Richard S. Shreve
ATTORNEY Nov. 1, 1966  E. T. MARCH  3,282,489
PORTABLE SOLENOID DRIVEN STAPLER
Filed Jan. 12, 1965  7 Sheets-Sheet 5

INVENTOR.
EARL T. MARCH
BY Richard S. Shreve Jr.
ATTORNEY

INVENTOR.
EARL T. MARCH
BY Richard S. Shreve Jr.
ATTORNEY

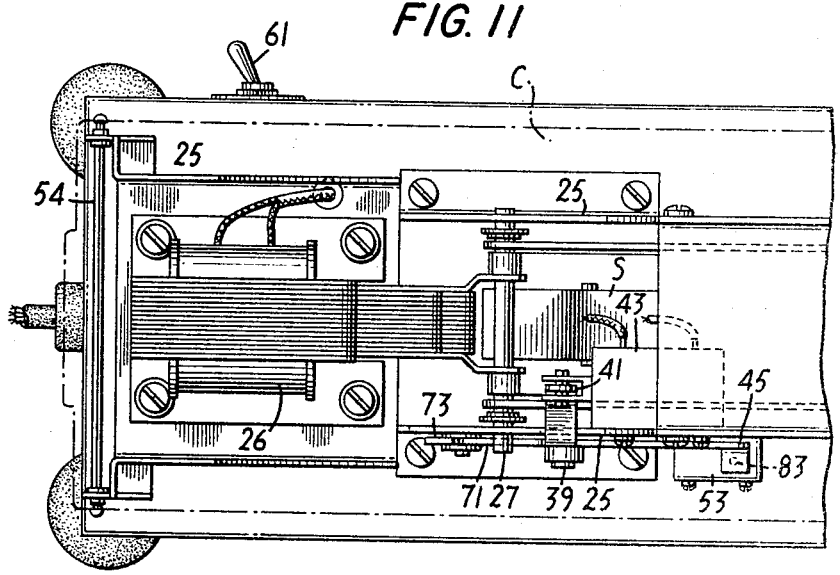
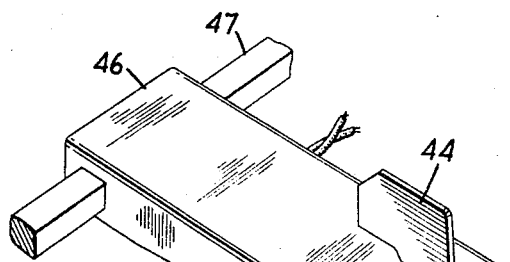
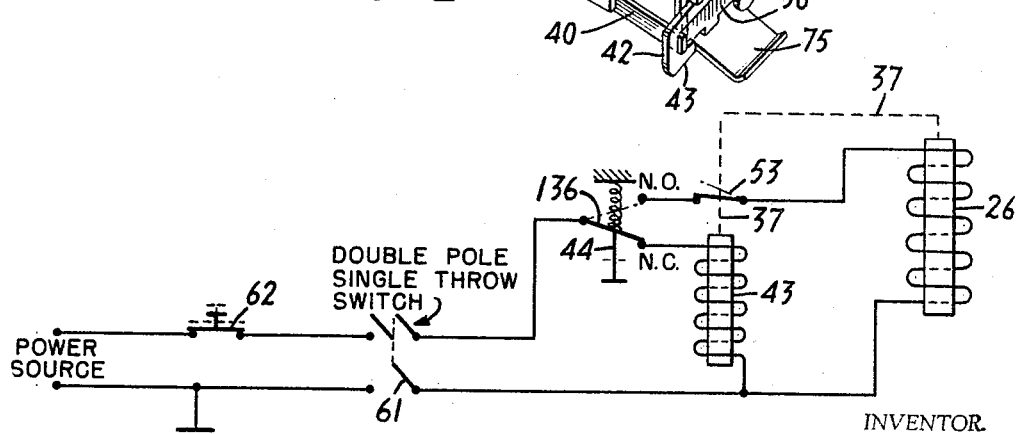

United States Patent Office 3,282,489
Patented Nov. 1, 1966

3,282,489
PORTABLE SOLENOID DRIVEN STAPLER
Earl T. March, Florham Park, N.J., assignor to Thomas Collators, Inc., New York, N.Y., a corporation of Delaware
Filed Jan. 12, 1965, Ser. No. 425,689
7 Claims. (Cl. 227—7)

This application is in part a continuation of my copending application Serial No. 279,735 filed May 13, 1963, now abandoned.

This invention relates to portable solenoid driven staplers, and more particularly to such fastening devices comprising a housing containing the solenoid and control mechanism thereof, readily opened to receive a conventional hand operated stapler unit to be driven by the solenoid.

Expedients for this purpose have been complicated and expensive in construction, inconvenient in operation and maintenance, and lacking in safety provisions. It is, therefore, the main object of the present invention to avoid these difficulties, and to simplify and economize the construction, and facilitate and render safe the operation of portable solenoid driven fastening devices.

Another object of the invention is to provide a fastening device having a trigger switch actuated by the oncoming sheets to be stapled for energizing the solenoid, with an electrical and mechanical interlock to de-energize the solenoid and prevent any undesired repeat operation of the stapler.

According to the present invention, the fastening device has a trigger switch for energizing the solenoid. The switch has a closing arm, and a hook pivoted on the trigger and hooked over the switch arm. The trigger has a panel extending toward the head to permit fastening close to the side edges of the sheets being fed.

Preferably the hook is formed into a loop which encloses the switch closing arm at all times. A small solenoid continuously energized holds a rocker plate in position closing the main solenoid circuit. The rocker plate has a cam actuated by return movement of the solenoid for opening such main circuit.

The anvil portion of the fastening device is mounted on a sheet metal box, preferably in a socket pressed into the top thereof. The head portion of the fastening device is enclosed in a cage mounted on the base above the socket. A cover comprising a sheet metal hood is pivoted onto the rear of the base. The solenoid switch is mounted in back of the socket, and the solenoid switch is mounted inside the base. The trigger is pivoted inside the base and extends up through a slot in the top of the base beside the socket.

The cover or sheet metal hood has a mouth aligned with the throat of the fastening device, with a transparent safety finger shield above said mouth through which said head-anvil throat is visible. The shield is pivoted and spring pressed to snap over the head of the fastening device in raised position of the cover.

In the open position, the bottom of the transparent shield rests upon a cushion mounted on top of the cage for the fastening device. The cage has a keyhole notch, and the cover has a latch comprising a spring pressed push button having a tapered portion engaging the cage notch.

The cage is provided with a catch for limiting the opening of the cover to only clear the fastening device for loading purposes, the catch being releasable to permit further opening of the cover for access to the solenoid. A safety cut-out switch for the solenoid is mounted in the base with a spring pressed button projecting up through the top of the base. The lower rear side of the cover rests on the safety switch button in closed position of the cover.

The fastening device is actuated by a toggle lever pivoted in the cage and journaling a roller engaging the operating knob, and a puller link connecting the toggle lever to the solenoid. The cage has a resilient bumper above the toggle lever.

Figure 7:
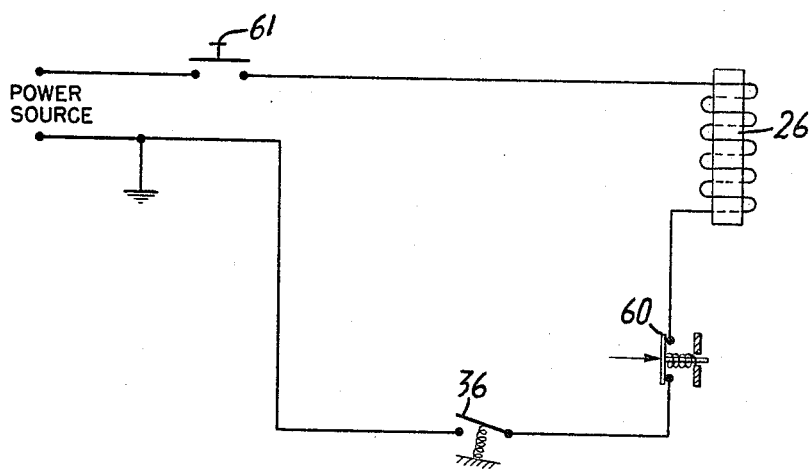
Figure 8:
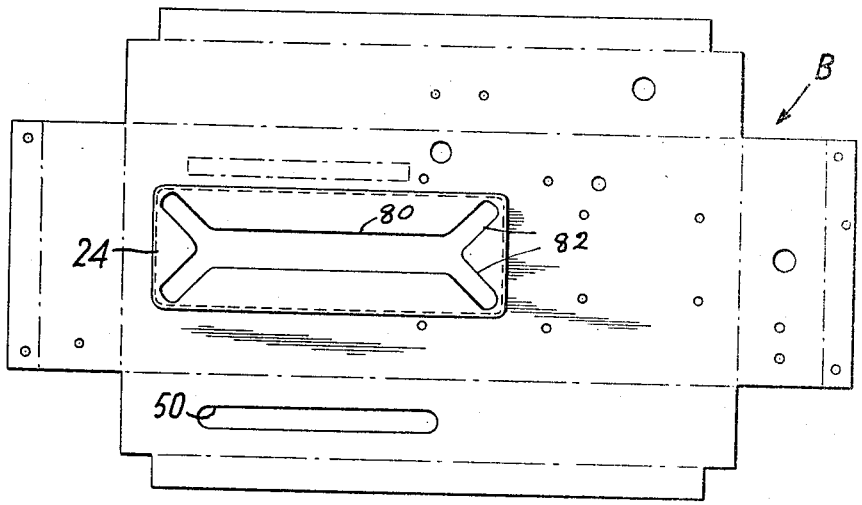
Figure 9:
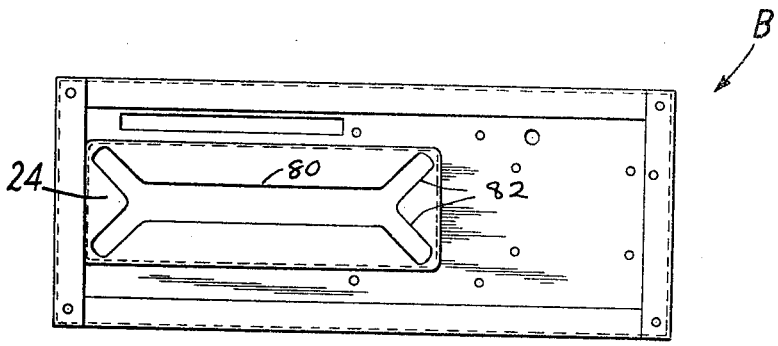
Figure 10:
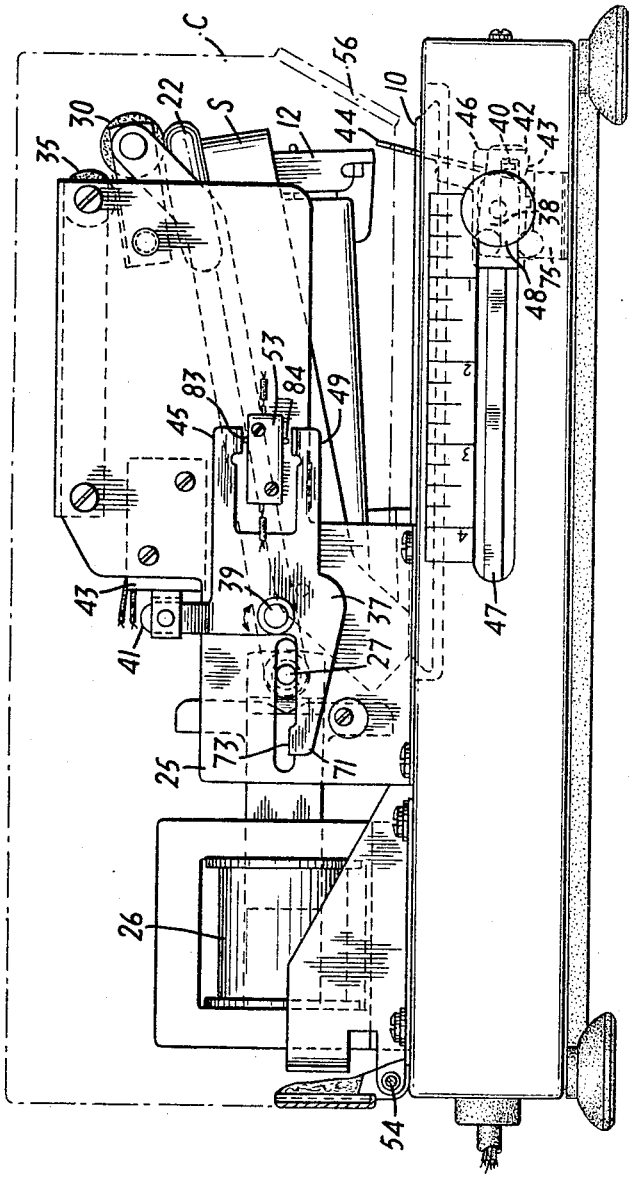

In the drawings:
FIGURE 1 is a perspective of sheet fastening machine according to the preferred embodiment of the present invention;
FIGURE 2 is a vertical longitudinal section through the machine shown in FIGURE 1;
FIGURE 3 is a horizontal section taken along the line 3—3 of FIGURE 2;
FIGURE 4 is a vertical transverse section taken along the line 4—4 of FIGURE 2;
FIGURE 5 is a portion of FIGURE 2, showing the parts at the end of the staple driving stroke;
FIGURE 6 is a perspective view of the trigger actuated solenoid switch;
FIGURE 7 is a wiring diagram of the solenoid energizing circuit;
FIGURE 8 is a plan view of a sheet metal blank for forming the base of the machine;
FIGURE 9 is a similar view of the finished base;
FIGURE 10 is an elevation of the side of the machine opposite to FIG. 2, showing the modified construction including the rocker plate;
FIGURE 11 is a plan of the modification shown in FIG. 10;
FIGURE 12 is a perspective of the modified trigger switch; and
FIGURE 13 is a wiring diagram of the modified control circuit.

The machine comprises a housing shown in FIGURE 1, having a base B in the form of a sheet metal box, and a cover or hood C pivoted on the rear of the box to swing up into open position to receive a portable hand stapler S.

As shown in FIGURE 2, this stapler S comprises an anvil 10 and a stapler head 12 with a throat therebetween to receive a group of sheets fed thereto. The head 12 is on the front of a lever having an operating knob 22. The bottom of the stapler unit is received in a socket 24 pressed into the sheet metal of the top of the base B. The head 12 is enclosed in a cage 25 secured to the base B above the socket 24.

Mounted on the base B in back of the socket 24 is a solenoid 26 for driving the stapler. The solenoid has an armature 31 pivoted by a pin 27 to a long link 28. The pin 27 extends through slots 29 in both sides of the cage 25, which serve as a cross head for the armature 31. The long link 28 has a roller 30 journaled at the far end thereof, and connected to a toggle link 32 having a pivot 34 fixedly mounted in the cage 25.

When the solenoid 26 is energized, the armature 31 pulls the long link 28, which pulls the toggle link 32 down around its fixed pivot 34, which causes the roller 30 to push down the front end of the stapler knob 22 and to ride rearwardly therealong with increasing pressure as it goes down. The top of the cage 25 has a resilient bumper 35 for the top of the toggle link 32.

Mounted in the box base B is a switch 36 for energizing the solenoid, which is preferably a standard micro switch which has a snap action. This switch is operated by a trigger 38 pivoted in the base B and extending up through a slot beside the socket 24, to be engaged by the oncoming edge of the sheets to be stapled.

As shown in FIGURE 6, the switch 36 has a closing arm 40, and the trigger 38 has pivoted thereon a catch lever 42 having a notch hooked over the arm 40. The trigger 38 has a side panel 44 above the box B and extending laterally toward the stapler head 12 to permit fastening close to the side edges of the sheets. Thus, when the sheets engage the trigger and move it forward, the hook 42 pulls the arm 40 to close the switch 36 and energize the solenoid for a stapling stroke.

When the head 20 descends, the impact thereof on the anvil 10 jars the hook 42, and causes it to bounce up and release the arm 40, which snaps back to open the switch 36 and de-energize the solenoid 26. Thus, the switch cannot be closed again until the trigger is returned and the hook 42 rides over the arm 40 into hooked position.

The switch 36 and trigger 38 are mounted on a slide 46 movable along a guide 47 inside the base B, and operated by a screw knob 48 extending through a longitudinal slot 50 in the side of the base B, to adjust the depth of the fastening from the oncoming edge of the sheet.

As shown in FIGURE 2, the base B has upstanding hinge lugs 52 secured to the top thereof, and the cover C has a pintle 54 passing through the lugs 52 and both sides of the cover, and held in position by conventional retaining rings 55 which cannot come unscrewed.

The front of the cover C has a mouth aligned with the throat of the fastening device, with a transparent safety finger shield 56 above the mouth, through which shield the head-anvil throat is clearly visible. The shield 56 is inclined inwardly to guide the sheets into the stapler throat. The top of the shield 56 is pivoted at 57 and pressed by a spring 58 to snap over the head 12 when the cover is raised, and rest on a cushion 59 on the top of the cage 25. When the cover is closed, the inside of the top thereof presses on the top of the cushion 59, to prevent any rattling of the parts.

As shown in FIGURE 2, mounted in the base B is a cut-out switch 60 for the circuit of the solenoid 26 from a main switch 61 also mounted in the base. The cut-out switch 60 has a spring pressed button 62 extending up through the top of the base B. The bottom of the rear portion of the cover 12 has an inturned flange 63 which rests on the button 62 when the cover is closed. The front portion of the flange 63 is cut away to extend the mouth of the casing for deep fastening when the slide 46 carrying the trigger 38 is moved rearward.

As shown in FIGURE 4, the cover is latched in closed position by a keyhole notch 64 in a flange on the top of the cage 25. This notch is engaged by a tapered portion 66 of a spring pressed push button 68 mounted inside the cover C. Mounted on the cage 25 is a pin 70 which forms a catch which is engaged by the inturned flange 63 of the bottom of the cover C, to limit the opening thereof to only clear the head 12, for loading the stapler or removal of the unit S. The cover can be sprung to one side to have the flange 63 clear the pin 70 for further opening for access to the solenoid 26, or adjacent parts for maintenance or repair.

Referring to FIGURE 2, when the button 68 is pressed, the cover is released to swing upward about the pintle 54. As the cover goes up, the spring pressed shield engages, and is pushed outward by, the head 22 and then the roller 30. After the shield passes the roller 30, the shield 56 is approximately vertical, in engagement with both the roller 35 and the flange 64. Further opening of the cover causes the shield 56 to snap over the top of the flange 64 and in over the cushion 59 and go on upward. On the descent of the cover, the shield 56 comes to rest on the top of the cushion 59. To close the cover, the shield 56 is pulled out by hand about its pivot 57 to clear the cushion 59, flange 64, rollers 35 and 30, and head 12.

As shown in FIGURE 1, the cover has a sheet metal central portion with a top and ends having a continuous longitudinal central rib 72 with lower flanges 74 on each side. The cover also has sheet metal side portions 76 with top and end flanges 78 overlying the flanges 74 and spot welded thereto while abutting the central rib 72.

As shown in FIGURES 8 and 9, the blank from which the base B is formed has a longitudinal slot 80 forked at both ends to form divergent slots 82, to remove metal to facilitate the pressing of the socket 24.

In the modified form of switch actuator shown in FIG. 12, the catch lever 42 has a looped end 43 which encloses the switch closing arm 40 at all times. In this form, the lever 42 cannot bounce, and a more positive means is provided to de-energize the solenoid 26.

As shown in FIG. 10, a rocker plate 37 is pivoted on a pin 39 mounted on the cage 25. The plate 37 has a vertical arm 41, which is connected to the armature of a small solenoid 43. The front of the rocker plate 37 is forked to form an upper tine 45 and a lower tine 49. Mounted on the cage 25 between these fork tines is a maintained contact switch 53.

The switch 53 has a top button 83 engaged by the fork tine 45 when it presses down to close, and a bottom button 84 alternately engaged by fork tine 49 when it presses up to open. The rocker plate 37 has a rearwardly extending arm 71 with an upstanding cam 73, which is in the path of the pin 27 near the end of the power stroke of the solenoid.

The switch 136 shown in FIG. 13 is a microswitch having two contacts that in turn close circuits, one normally off NO, and one normally closed NC. The normally closed circuit energizes the small solenoid 43, which pulls on the arm 41. This swings the rocker plate 37 clockwise about the pin 39, which causes the fork tine 45 to press down on the top button 83 and close the maintained contact switch 53.

When engaged by the oncoming paper to be stapled, the trigger 44 closes the NO circuit of switch 136, which through the already closed maintained contact switch 53 energizes the main solenoid 26. But at the same time, the trigger 44 opens the NC circuit to de-energize the small solenoid 43.

When the power stroke of the main solenoid causes the pin 27 to engage the cam 73 and swing the rocker plate 37 counterclockwise about the pin 39, the fork tine 49 engages the bottom button 84 to open the maintained contact switch 53. This de-energizes the main solenoid 26, and prevents any undesired repeat stroke thereof.

When the stapled paper is removed and the trigger switch 136 is released, current is again fed to the small solenoid 43 through the NC circuit, which returns the maintained contact switch 53 to on position, thus completing the cycle.

Referring to FIG. 12, the slide 46 is held in selected position along guide 47 by screw knob 48 shown in FIG. 4. When this screw knob is released, the clearance permits the other end of the slide to sag. For this reason, a spring leaf 75 is provided to support such other end and prevent accidental tripping of the trigger 38.

What is claimed is:

1. In a machine for fastening together a group of sheets, a fastening device having a knob and an anvil, a cage mounted on said base enclosing said knob, a puller link having a roller journaled therein engaging said stapler knob, a toggle link having at one end a fixed pivot in said cage above said knob and the other end connected to said roller, and a solenoid mounted on said base in back of said anvil for pulling said roller journaled puller link to cause said toggle link to swing about its fixed pivot and thrust against the journal of said roller to push down the front end of said stapler knob and slide rearwardly therealong as it goes down to exert an increasing pressure on the stapler knob.

2. In a machine for fastening together a group of sheets, a fastening device having a knob portion and an anvil portion, a base receiving said anvil portion, a cage mounted on said base enclosing said knob portion, a solenoid mounted on said base in back of said anvil portion, a toggle lever pivoted in said cage and journaling a roller engaging said knob portion, and a puller link connecting said solenoid to said toggle lever, the top of the cage having a resilient bumper for the top of said toggle link.

3. Machine as claimed in claim 2, in which said solenoid has an armature connected to said puller link by a pivot pin, and said cage has a slot in which said pivot pin rides to guide said armature.

4. In a machine for fastening together a group of sheets, a fastening device having a head and an anvil and a throat therebetween, a base comprising a sheet metal box having a socket in the top thereof receiving the anvil of said fastening device, a solenoid mounted on said base in back of said socket for driving said head down onto said anvil, a switch mounted inside said box for energizing said solenoid, a trigger pivoted inside said box extending up through a slot in said top portion beside said anvil for engagement by the sheets inserted into the throat, a cover pivoted to the rear of said base and enclosing said solenoid and the head of said fastening device, the front of said cover having a mouth aligned with said throat, and a transparent safety finger shield above said mouth through which said throat is clearly visible.

5. Machine as claimed in claim 4, in which said transparent shield is inclined rearwardly to guide the sheets into said throat, and pivoted and spring pressed to pass over the head of said fastening device when said cover is pivoted to an open position.

6. Machine as claimed in claim 5, in combination with a cage mounted on said base enclosing said fastening device, said cage having a cushion receiving the bottom of said shield in said open position of said cover, said cushion engaging the inside of the top of the cover in closed position.

7. In a machine for fastening together a group of sheets, a fastening device having a head and an anvil with a throat therebetween, a main solenoid for driving said head down onto said anvil, a trigger switch engaged by the sheets inserted into said throat, a contact switch in series with said solenoid and said trigger switch, a rocker plate pivotally mounted on the machine, a small solenoid normally energized by said trigger switch pivoting said rocker plate in one direction to close said contact switch, said trigger switch de-energizing said small solenoid when engaged by said inserted sheets and energizing said main solenoid, and a cam on said rocker plate actuated by the end portion of the power stroke of said main solenoid to pivot said rocker plate in a second direction to open said contact switch, said trigger switch re-energizing said small solenoid when the fastened group of sheets is removed.

References Cited by the Examiner
UNITED STATES PATENTS

| | | | |
|---|---|---|---|
| 1,940,980 | 12/1933 | Svenson | 227—5 |
| 2,650,360 | 9/1953 | Nardone | 227—131 X |
| 2,656,537 | 10/1953 | Geel | 227—131 |
| 2,879,510 | 3/1959 | Boyle et al. | 227—131 |
| 2,936,454 | 5/1960 | Lundeberg | 227—18 |
| 3,022,512 | 2/1962 | Oussani | 227—131 X |

GRANVILLE Y. CLUSTER, JR., *Primary Examiner.*